UNITED STATES PATENT OFFICE.

EDWARD U. WEISS, OF NEW YORK, N. Y.

IMPROVEMENT IN PROCESSES FOR EXTRACTING MALT.

Specification forming part of Letters Patent No. 172,532, dated January 18, 1876; application filed December 13, 1875.

*To all whom it may concern:*

Be it known that I, EDWARD U. WEISS, of New York, in the county of New York and State of New York, have invented certain new and useful Improvements in Processes for Extracting Malt; and I do hereby declare that the following is a full, clear, and exact description thereof.

The nature of my invention consists in a new and improved process for extracting malt, as will be hereinafter more fully set forth.

The malt is first peeled, and pulverized or ground to any degree of fineness, and bolted, or not, as desired. The husk or bran is separated from the powder, and the powder placed in the mashing-vessel, where, either before or after the mashing, it is mixed with cut straw or its equivalent, and mashed in the usual way. The liquid is then drawn off or separated by aid of pressure. The bottom of the vessel in which the malt is mashed or separated from the liquid is to be provided with a straw or other suitable filter. After having pressed off the liquid, the latter is poured back upon the mass in the mashing-vessel, and there pressed and filtered again, and then proceeded in the usual way of exhausting the malt. The liquid is to be filtered through straw if not clear enough for further operation.

The malt used with the above process will give a greater percentage of sugar, and consequently alcohol, than by the usual process. The bran of the malt being separated, the quality of beer will be better and finer than the extract of malt with the bran, which has a more or less disagreeable taste, and causes the rapid souring of the beer.

What I claim is—

The within-described process for extracting malt by separating the bran from the malt, and mixing the latter with straw or its equivalent, and then mashing and filtering the same, substantially as herein set forth.

In testimony that I claim the foregoing as my own, I affix my signature in presence of two witnesses.

E. U. WEISS.

Witnesses:
 JOS. HARTUNG,
 OTTO MAÏER.